United States Patent
Zumkehr et al.

(10) Patent No.: US 6,173,414 B1
(45) Date of Patent: Jan. 9, 2001

(54) SYSTEMS AND METHODS FOR REDUCED ERROR DETECTION LATENCY USING ENCODED DATA

(75) Inventors: John F. Zumkehr, Orange, CA (US); Amir A. Abouelnaga, Great Falls, VA (US)

(73) Assignees: McDonnell Douglas Corporation, St. Louis County, MO (US); TRW, Inc., Redondo Beach, CA (US)

( * ) Notice: Under 35 U.S.C. 154(b), the term of this patent shall be extended for 0 days.

(21) Appl. No.: 09/076,607

(22) Filed: May 12, 1998

(51) Int. Cl.[7] .................................................. G06F 11/00
(52) U.S. Cl. .................................................. 714/6; 714/11
(58) Field of Search .................................. 714/6, 7, 10, 11, 714/12, 13, 25, 30, 31, 32, 39, 47; 395/500.05, 575

(56) References Cited

U.S. PATENT DOCUMENTS

| | | |
|---|---|---|
| 4,455,655 * | 6/1984 | Galen et al. ........................... 371/38 |
| 4,541,094 * | 9/1985 | Stiffler et al. ........................ 371/68 |
| 4,597,084 * | 6/1986 | Dynneson et al. ..................... 371/51 |
| 4,827,478 * | 5/1989 | Chan ..................................... 371/38 |
| 5,136,704 | 8/1992 | Danielsen et al. . |
| 5,193,167 | 3/1993 | Sites et al. . |
| 5,269,016 * | 12/1993 | Butler et al. ......................... 395/575 |
| 5,291,496 * | 3/1994 | Andaleon et al. ....................... 371/3 |
| 5,297,052 * | 3/1994 | McIntyre et al. .................... 364/453 |
| 5,450,340 * | 9/1995 | Nicolaidis ............................ 364/738 |
| 5,469,551 | 11/1995 | Sites et al. . |
| 5,491,787 | 2/1996 | Hashemi . |
| 5,504,859 | 4/1996 | Gustafson et al. . |
| 5,619,642 * | 4/1997 | Nielson et al. ................. 395/182.04 |
| 5,630,056 | 5/1997 | Horvath et al. . |
| 5,663,969 * | 9/1997 | Tsou .................................... 371/51.1 |
| 5,907,671 * | 5/1999 | Chen et al. ..................... 395/182.04 |
| 5,917,838 * | 6/1999 | Wardrop ............................ 371/40.12 |

* cited by examiner

*Primary Examiner*—Nadeem Iqbal
(74) *Attorney, Agent, or Firm*—Alston & Bird LLP

(57) ABSTRACT

A fault-tolerant data processing system includes first and second microcircuits in a master/checker configuration. The first and second microcircuits perform identical transforming operations on identical data to generate respective outputs. The internal state of each microcircuit is encoded to a short code word and communicated to an external comparator. The comparator compares the encoded internal state data of the first and second microcircuits to determine if an error has occurred. Low error detection latency may be realized due to increased frequency of error detection, with minimal hardware and performance overhead.

16 Claims, 2 Drawing Sheets

SYSTEMS AND METHODS FOR REDUCED ERROR DETECTION LATENCY USING ENCODED DATA

The U.S. Government has a paid-up license in this invention and the right in limited circumstances to require the patent owner to license others on reasonable terms as provided for by the terms of Contract No F03602-88-C-0058, Subcontract AB9720218S, awarded by the Air Force.

FIELD OF THE INVENTION

The present invention generally relates to digital data processing, and more particularly, to error detection in digital data processors.

BACKGROUND OF THE INVENTION

Modern technology has brought about many advancements in the design and implementation of computer processors. However, the possibility of errors arising in digital signals representing either data or control words is still problematic in all computer systems. An undetected error, due to a variety of fault sources, in either the processing control flow or the data may result in propagation of erroneous data each time a further operation is performed on either the data, or any data derived from the erroneous data. An error in a control word can result in rapid propagation of corrupted data and the corruption of good data by the processing with the erroneous control word. The many efforts made in recent years to minimize or contain the adverse effects of faults, as they are manifested through resultant errors, have drastically reduced the potentially devastating impact of errors on the integrity of computational results. However, error detection and recovery continue to be major concerns to computer system designers as designs are constantly being driven to higher standards of dependability, throughput, levels of integration, and computational complexity.

A variety of strategies and techniques have been proposed for error detection. Analyses to determine the optimal error detection technique must consider factors such as error detection latency and coverage. Strategies based on information redundancy and techniques for their realization yield designs with low error detection latency. The percent of detectable errors, i.e., error coverage, is often used to select the desired information redundancy technique. The range of techniques spans the use of information encoding schemes, i.e., check codes, to using a complete copy of the computer system, i.e., a redundant or duplicate system. Error check codes use a plurality of additional information, i.e., bits which are an encoded representation of the original data or control sequence in order to determine whether the data or control sequence has erroneously changed. Examples of error check codes include parity code for a data word and Cyclic Redundancy Code (CRC) for execution control sequences.

If check codes are utilized, an operation is performed so that the check code is valid after each operation. With arithmetic logic, for example, the operation may be carried out in a different number system such as with the residue number scheme, a detailed discussion of which can be found in Avizienis, A. A., "Arithmetic Error Codes: Cost and Effectiveness Studies for Application in Digital Design," IEEE Trans. Comp., Vol. C-20, No. 11, November 1971, pp. 1322–1331. However, the use of a different number system involves an initial conversion to that number system, and, a subsequent conversion back from that number system after the operation is completed. Accordingly, this method of error detection may significantly reduce the performance of the data processor.

The use of redundant, or duplicate, circuitry to check for errors has long been recognized as a highly effective error checking technique. The redundant circuitry approach essentially comprises two processors, a primary processor and a redundant processor which are similarly connected to receive identical addresses, data, control signals and instructions. The primary processor, referred to as the master processor, provides normal processing and control. The redundant processor, referred to as the checker processor, runs in parallel with the master processor. If the system is operating properly, the master and checker processors operate in lock step and the results determined by the two processors should be equal or identical. Otherwise, an error has occurred in the system. This approach has the advantage that the checker processor is identical to the master processor, and therefore, can be used as a spare resource in the event that the master processor fails or become faulty. This approach, however, requires twice as much hardware as a single processor, though it has a smaller impact on performance than the check code approach discussed above. The master and checker processors typically run in parallel, and only processor outputs are used for error detection. Thus, the impact on internal processor throughput may be essentially eliminated.

Further, the redundant circuitry (also referenced to as master/checker) approach to fault detection requires that the master's data be visible to the checker. However, current trends toward increased integration on a chip and the associated computational complexity have decreased visibility to internal operations. The result of an erroneous operation which results in changing only an internal state (e.g., registers, caches, etc.) that is not visible to the checker may not be detected for a relatively long time. The error, in such a case, may only become visible when the master's state data is made visible to the checker, or another internal operation uses the state data in a manner that makes it visible. This can result in exceptionally long error detection latencies. Any effort to reduce the error detection latency by making the output of each master's operation visible to the checker is typically not practical because of pin limitations and the adverse impact on performance. A processor's internal bandwidth, i.e., its processing throughput, is typically much greater than the external band-width. Input/output operations are relatively slow, and therefore, it is generally considered too costly to make all the master's output data visible for checking.

Therefore, a heretofore unresolved need existed in the industry for an error detection system and method that provides improved detection in a master/checker system with minimal error detection hardware overhead, minimal error detection latency, and minimal adverse impact on performance.

SUMMARY OF THE INVENTION

It is therefore an object of the present invention to provide improved error detection.

It is another object of the present invention to provide improved error detection in a master/checker configuration with minimum hardware and performance overhead.

It is yet another object of the present invention to provide improved error detection in a master/checker configuration with reduced error detection latency.

These and other objects of the present invention are provided by a fault-tolerant digital data processing system that comprises a first microcircuit that performs an internal operation on a data set to generate a first internal state, and a second microcircuit that performs a identical internal operation on an identical data set to generate a second internal state. This is commonly referred to as a master/checker, or duplicate, configuration. The system further comprises a first data encoding mechanism that encodes the first internal state into a first code, a second data encoding mechanism that encodes the second internal state into a second code, and a comparator external to the first and second microcircuits that compares the first code and the second code to determine if an error has occurred. Additionally, by encoding the internal states of the first and second microcircuits so as to reduce the number of bits of data needed to represent the outputs, fewer pin connections are needed to make the outputs externally visible for performing error detection.

The data encoding mechanism may be as simple as a single bit parity encoding operation, or any other suitable scheme that meets system requirements for, among other things, the number of signals to be compared, the fault environment, or the desired fault coverage. The comparator may be configured to generate a predetermined signal if the first code and the second code are equal or identical. Further, the first microcircuit and the second microcircuit may perform transforming operations.

In accordance with another aspect of the present invention, a method for fault-tolerant data processing comprises the steps of processing data by a first microcircuit to generate a first output, processing identical data by second microcircuit to generate a second output, encoding the first internal state within the first microcircuit to generate a first code, encoding the second internal state within the second microcircuit to generate a second code, and comparing the first code and the second code. In the method, the steps of encoding the first internal state and encoding the second internal state may include performing single bit parity encoding. In addition, the step of comparing the first code and the second code may include the step of determining if the first code and second code are equal or identical.

Other features and advantages of the present invention will become apparent to one skilled in the art upon examination of the following drawings and detailed description. It is intended that all such features and advantages be included herein within the scope of the present invention, as defined by the appended claims.

BRIEF DESCRIPTION OF THE DRAWINGS

The present invention can be better understood with references to the following drawings. The elements of the drawings are not necessarily to scale, emphasis instead being placed upon clearly illustrating the principles of the present invention. Furthermore, like reference numerals designate corresponding parts throughout the several views.

DETAILED DESCRIPTION OF PREFERRED EMBODIMENTS

The present invention will now be described more fully hereinafter with reference to the accompany drawings, in which preferred embodiments of the invention are shown. This invention may, however, be embodied in different forms and should not be construed as limited by the embodiment set forth herein. Rather, these embodiments are provided so that this disclosure will be thorough and complete, and will fully convey the scope of the invention to those skilled in the art.

For purposes of the present disclosure, a transforming operation can be any operation that results in a change in the check code. For instance, writing a data word from one register to another in a processor is not a transforming operation since the data word does not change, whereas adding two data words with associated check codes is a transforming operation because the check codes of the two data words have to be processed to produce a new check code representative of the sum of the two data words.

I. Architecture

Figure 1:
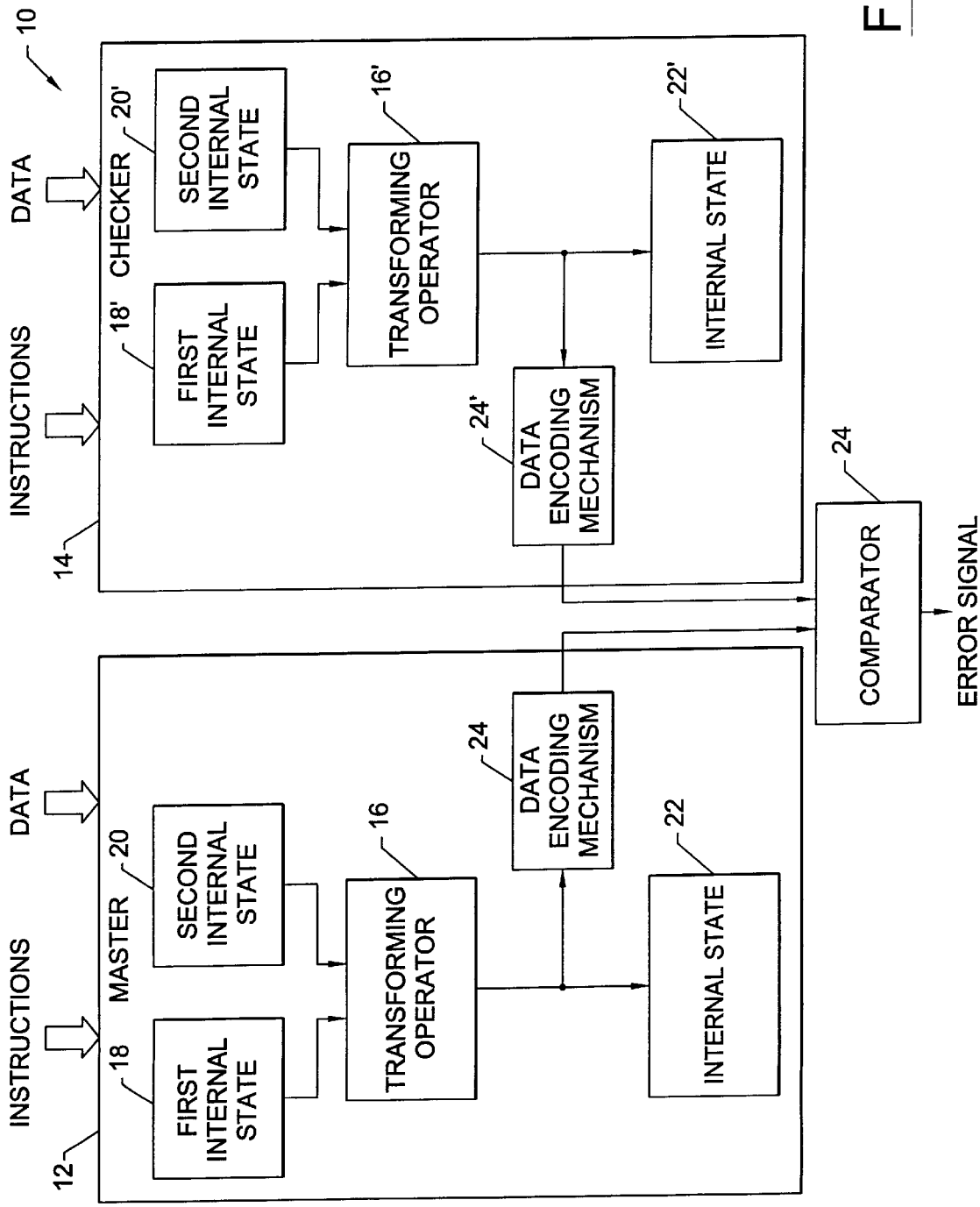
FIG. 1 is a schematic block diagram of a dual microcircuit system in a master/checker configuration, wherein the dual microcircuit system includes error detection in accordance with the present invention.

With reference to FIG. 1, a dual microcircuit system 10 is illustrated. The dual microcircuit system 10 comprises a master microcircuit 12 and a substantially identical checker microcircuit 14. As will be understood by those skilled in the art, the master microcircuit 12 and the checker microcircuit 14 operate as master/checker microcircuits, whereby the master microcircuit 12 provides the normal processing, control, etc. as maybe needed for the particular application to which the dual microcircuit system 10 is applied. Microcircuits 12, 14 receive substantially the same instructions, data, control signals, and clock signals. The checker microcircuit 14 operates in lock step with the master microcircuit 12 such that the checker microcircuit 14 can compare its output with that of the master microcircuit 12 to detect if an error has occurred. In addition, the checker microcircuit 14 may supplant the master microcircuit 12 to provide normal processing, control, etc., if the master microcircuit were to become faulty or inoperable. Because the master/checker configuration is well known to those skilled in the art, it need not be further described herein. A discussion of this configuration, also called duplication, can be found in Siewiorek, D. P and R. S. Swarz, "Reliable Computer Systems Design and Evaluation", Digital Equipment Corporation, 1992.

The master microcircuit 12 may include one or more functional operations so as to comprise, for example, a microprocessor. For purposes of brevity, a single transforming operator 16 for performing a single designated functional operation is provided by the master microcircuit 12, though it will be appreciated that more than one transforming operator may be provided by the master microcircuit 12. The function performed by the transforming operator 16 can be any function which changes or converts input data into output data, such as a multiply function, divide function, add function, subtract function, etc. Thus, an example of a transforming operation is an arithmetic logic unit. As described above in the Background section, such functions may corrupt check codes when operating on data having check codes by producing a resultant check code that is not be representative of the resulting data. Thus, the check codes become ineffective so alternative methods of error detection may be utilized, such as master/check error detection.

The transforming operator 16 performs a designated function on a first internal state 18 and a second internal state 20 in order to generate an output internal state 22. The internal states 18 and 20 may represent an attribute, condition, or information content that may be inputted into the transforming operator 16 in order to generate an output or next internal state 22, as commonly described with regard to the state machine of a processor of microcircuit. For example, register values of two (2) and four (4) which represent internal states can be added together by an "Add" transforming operator to output a six (6) as the next internal state.

The checker microcircuit 14, as previously discussed, receives the same data, control signals, instructions, clock signals, etc. as the master microcircuit 12 so that the checker microcircuit 14 operates in synchronized fashion with the master microcircuit 12. Thus, a first internal state 18' and a second internal state 20' are inputted into a transforming operator 16' in order to generate an output internal state 22'. In accordance with known principals of error detection, even though the transforming operators 16, 16' may destroy the checking codes associated with the inputted internal states, the output internal states of the transforming operators should be identical in the absence of an error. Thus, comparing the output internal states to determine if they are equal or identical is a method of determining if an error has occurred.

As noted in the Background section, however, comparing the output of transforming operators 16, 16' is often prohibitively expensive due to the number of pins required to check the output internal states of the transforming operators present within a processor or microcircuit. For example, the results of a single 64-bit adder implemented by a transforming operator requires 64-bits of data be communicated externally to a comparator which requires 64 pins. However, given current designs which provide higher levels of integration, it is usually impractical or undesirable to implement such an external number of connections.

In accordance with the present invention, the master microcircuit 12 and the checker microcircuit 14 each include a data encoding mechanism 24, 24' to receive the output of the transforming operators 16 and 16', respectively. The data encoding mechanisms 24, 24' then encode the results of the transforming operators for use in error detection performed by a comparator 26. In accordance with the present invention, the encoding performed by the data encoding mechanisms 24, 24' reduces the number of bits associated with the outputs of the transforming operators 16, 16', respectively. Therefore, fewer external connections are necessary to make the outputs visible for error detection. Since the outputs are encoded to produce a shorter word, there may be some reduction in error detection coverage, though this is typically offset by the reduced error detection latency resulting from the increased error checking frequency.

The amount and type of encoding performed by the data encoding mechanisms 24, 24' may depend upon the number of signals compared by the comparator 26, the anticipated fault environment, and the needed fault coverage. For example, if a single bit error is the predominate error in the results of the function performed by the transforming operators 16, 16', a single parity bit can serve as the function performed by the data encoding mechanisms 24, 24'. Alternatively, if the failure mode is typically multiple bit, then more signals may be used for the encoded data such as provided by Hamming codes. Thus, different encoding schemes may be especially desirable for particular types of data, and/or to provide more or less robust error detection and error coverage. Therefore, the data encoding mechanisms 24, 24' can be as simple as single bit parity generation circuits.

The outputs of the data encoding mechanisms 24, 24' are provided to the comparator 26 which compares the two outputs to determine if an error has occurred. If the two outputs differ in a particular manner or form, then the comparator 26 generates a signal indicating that an error has occurred. The comparator 26 can be implemented in any suitable logic, preferably using equal or not equal functions, as will be obvious to those skilled in the art.

Figure 2:
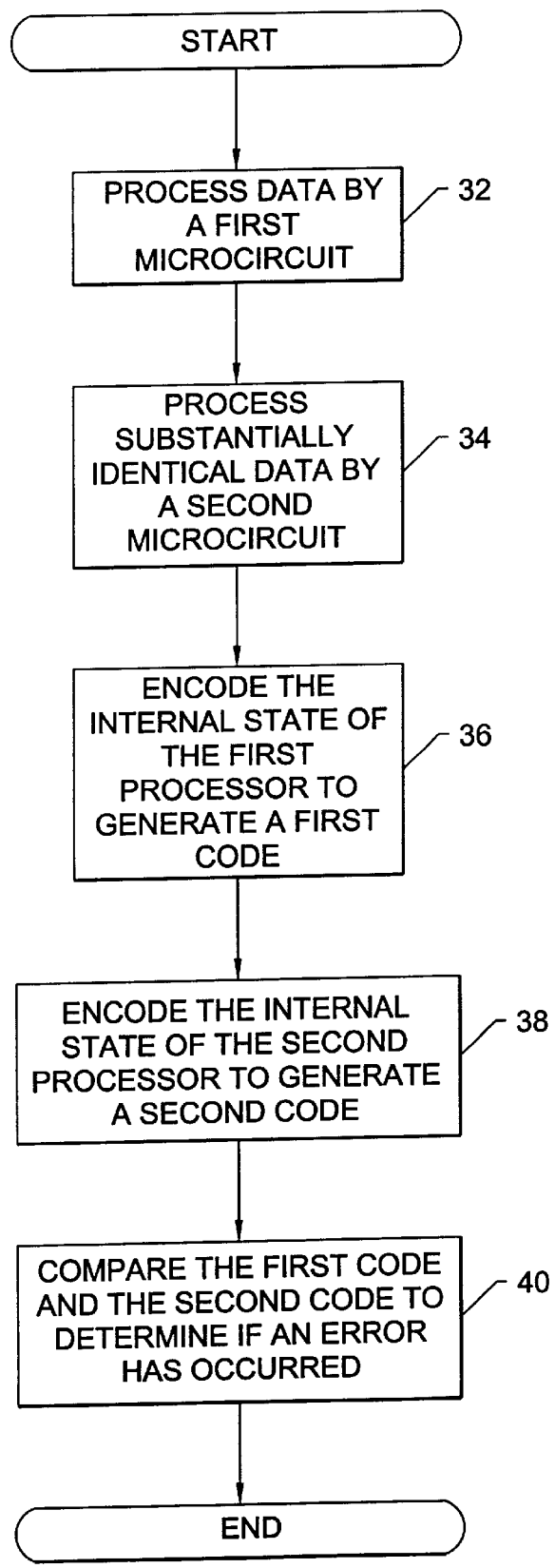
FIG. 2 is a flowchart of the operation of the error detection performed by the dual microcircuit system of FIG. 1 in accordance with the present invention.

Accordingly, by encoding the output of the transforming operators 16, 16', a fraction of the number of the un-encoded transform output bits may be provided to the comparator 26 for error detection. For instance, taking the 64-bit adder example above, the 64 bit output may be encoded into 8 bits of data that can then be efficiently provided to the comparator 26 for error detection, as opposed to the 64 bits of data provided under conventional error detection schemes. Thus, the hardware overhead associated with providing the external connections for the transforming operators 16, 16' of the master and checker microcircuits is substantially reduced. By reducing the number of input/output pins required for error detection, it is believed that error checks will be performed more frequently on transforming operators, thereby reducing error detection latency. The result is a fault-tolerant dual microcircuit system 10 that reacts faster to error conditions and facilitates improved containment of error propagation II. Operation The preferred operation and sequence of events corresponding with master/checker microcircuits 10 of the present invention and the associated methodology are described hereafter with reference to FIG. 2.

In operation, data received by a master/checker system is initially processed by a first microcircuit, as indicated by block 32. A second microcircuit receives and processes identical data, performing the same function as the first microcircuit, as indicated by block 34. At block 36, the output (i.e.,internal state of the first microcircuit is encoded to generate a first code. Likewise, at block 38, the output (i.e., the internal state) of the second microcircuit is encoded to generate a second code. Lastly, the first code and second code are compared at block 40 to determine if an error has occurred.

In the drawings and specification, there had been disclosed typical preferred embodiments of the invention and, although specific terms are employed, they are used in a generic descriptive sense only and not for purposes of limitation the scope of the invention being set forth in the following claims.

Wherefore, the following is claimed:

1. A fault tolerant data processing system, comprising:
a first microcircuit that performs an internal operation on data to generate a first output, wherein said first microcircuit includes a first data encoding mechanism that encodes said first output into a first code of fewer bits than said first output;
a second microcircuit that performs an identical internal operation on identical data to generate a second output, wherein said second microcircuit includes a second data encoding mechanism that encodes said second output into a second code of fewer bits than said second output; and
a comparator mechanism disposed external to said first and second microcircuits that receives only said first code and said second code and compares said first and second codes to determine if an error has occurred in one of said internal operations.

2. The system of claim 1, wherein said first encoding mechanism includes means for performing a single bit parity operation.

3. The system of claim 1, wherein said second encoding mechanism includes means for performing a single bit parity operation.

4. The system of claim 1, wherein said comparator mechanism determines if said first code and said second code are equal.

5. The system of claim 1, wherein said first microcircuit and said second microcircuit are in a master/checker configuration.

6. The system of claim 1, wherein said first microcircuit and said second microcircuit include respective means for performing transforming operations.

7. A method for fault-tolerant data processing, comprising the steps of:

processing data by a first microcircuit to generate a first output;

processing identical data by a second microcircuit to generate a second output;

encoding the first output within the first microcircuit to generate a first code of fewer bits than said first output;

encoding the second output within the second microcircuit to generate a second code of fewer bits than said second output; and communicating only said first code and said second code to a comparator which compares the first code and the second code to determine if an error has occurred in one of said steps of processing.

8. The method of claim 7, wherein said step of encoding the first output includes performing a single bit parity operation.

9. The method of claim 7, wherein said step of encoding the second output includes performing a single bit parity operation.

10. The method of claim 7, wherein said step of comparing the first code and the second code includes determining if the first code and the second code are equal.

11. A system for fault-tolerant data processing, comprising:

first means for processing data to generate a first output;

second means for processing said data to generate a second output;

wherein said first means for processing comprises first means for encoding said first output to generate a first code of fewer bits than said first output;

wherein said second means for processing comprises second means for encoding said second output to generate a second code of fewer bits than said second output; and means external to said first means for processing and said second means for processing for receiving only said first code and said second codes and for comparing said first and second codes to determine if an error has occurred in processing said data.

12. The system of claim 11, wherein said first means for encoding includes means for performing a single bit parity operation.

13. The system of claim 11, wherein said second means for encoding includes means for performing a single bit parity operation.

14. The system of claim 11, wherein said means for comparing includes areas for determining if said first code and said second code are equal.

15. The system of claim 11, wherein said first means for processing and said second for processing are in a master/checker configuration.

16. The system of claim 11, wherein said first means for processing and said second means for processing respectively include means for performing transforming operations.

* * * * *